(12) United States Patent
Shao et al.

(10) Patent No.: US 11,803,173 B2
(45) Date of Patent: Oct. 31, 2023

(54) PRESET MANAGEMENT METHODS OF GAS PIPELINE NETWORK FOR SMART GAS AND INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Lei Zhang, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/061,508

(22) Filed: Dec. 5, 2022

(65) Prior Publication Data

US 2023/0095727 A1 Mar. 30, 2023

(30) Foreign Application Priority Data

Nov. 11, 2022 (CN) .......................... 202211408774.9

(51) Int. Cl.
*G05B 19/41* (2006.01)
*G16Y 40/30* (2020.01)
(Continued)

(52) U.S. Cl.
CPC ..................... *G05B 19/4155* (2013.01); *G05B 2219/41108* (2013.01); *G06Q 10/04* (2013.01);
(Continued)

(58) Field of Classification Search
CPC ...... G05B 19/4155; G05B 2219/41108; G16Y 40/30; G16Y 10/35; G16Y 20/40;
(Continued)

(56) References Cited

U.S. PATENT DOCUMENTS

| | | | | |
|---|---|---|---|---|
| 11,487,273 | B1 * | 11/2022 | Zhao | ................ G05B 19/41885 |
| 2009/0035627 | A1 * | 2/2009 | Tohidi | ...................... C10L 3/10 |
| | | | | 423/437.1 |

(Continued)

FOREIGN PATENT DOCUMENTS

| CN | 102339502 A | 2/2012 |
|---|---|---|
| CN | 102607641 A | 7/2012 |

(Continued)

OTHER PUBLICATIONS

Son et al., "Time Series Clustering of Electricity Demand for Industrial Areas on Smart Grid", Mar. 2020, Energies 2020, 13, 2377. (Year: 2020).*

(Continued)

*Primary Examiner* — Mohammad Ali
*Assistant Examiner* — Kelvin Booker
(74) *Attorney, Agent, or Firm* — METIS IP LLC

(57) ABSTRACT

The present disclosure provides a preset management method of a gas pipeline network for a smart gas, which is performed by a smart gas management platform. The smart gas management platform comprises a smart user service management sub-platform, a smart operation management sub-platform and a smart gas data center. The method comprises: obtaining, by the smart gas data center, a region feature of each region within a target range through a smart gas sensing network platform; determining, by the smart operation management sub-platform, a gas demand degree of the each region based on the region feature of the each region; determining, by the smart operation management sub-platform, a region as a first-class region based on the gas demand degree in the region meeting a preset condition, and determining a gas pipeline network opening scheme for the region.

7 Claims, 5 Drawing Sheets

(51) Int. Cl.
*G16Y 20/40* (2020.01)
*G06Q 50/06* (2012.01)
*G06Q 10/04* (2023.01)
*G05B 19/4155* (2006.01)

(52) U.S. Cl.
CPC .............. *G06Q 50/06* (2013.01); *G16Y 20/40* (2020.01); *G16Y 40/30* (2020.01)

(58) Field of Classification Search
CPC ........ G16Y 40/10; G16Y 40/50; G06Q 50/06; G06Q 10/04; G06Q 10/06315
See application file for complete search history.

(56) References Cited

U.S. PATENT DOCUMENTS

| | | | | |
|---|---|---|---|---|
| 2012/0180502 | A1* | 7/2012 | Morris | F17C 11/007 62/47.1 |
| 2016/0281607 | A1 | 9/2016 | Asati et al. | |
| 2017/0283014 | A1* | 10/2017 | Baker | E21B 43/01 |
| 2017/0364043 | A1* | 12/2017 | Ganti | G05B 17/02 |
| 2018/0284758 | A1* | 10/2018 | Cella | G05B 23/0283 |
| 2019/0089788 | A1* | 3/2019 | Shao | H04L 67/125 |
| 2019/0273783 | A1* | 9/2019 | Shao | G06Q 50/26 |
| 2019/0273784 | A1* | 9/2019 | Shao | H04L 67/562 |
| 2019/0324439 | A1* | 10/2019 | Cella | G06F 18/217 |
| 2019/0324444 | A1* | 10/2019 | Cella | G05B 19/4183 |
| 2019/0339688 | A1* | 11/2019 | Cella | H04L 1/18 |
| 2020/0103894 | A1* | 4/2020 | Cella | G05B 23/0264 |
| 2020/0133257 | A1* | 4/2020 | Cella | G05B 19/4183 |
| 2020/0225655 | A1* | 7/2020 | Cella | G05B 19/41875 |
| 2020/0348662 | A1* | 11/2020 | Cella | G05B 23/0286 |
| 2022/0329074 | A1* | 10/2022 | Wang | H02J 3/144 |
| 2022/0382263 | A1* | 12/2022 | Zhao | G06Q 10/0637 |

FOREIGN PATENT DOCUMENTS

| | | |
|---|---|---|
| CN | 105743751 A | 7/2016 |
| CN | 105847098 A | 8/2016 |
| CN | 105915581 A | 8/2016 |
| CN | 105930939 A | 9/2016 |
| CN | 110108322 A | 8/2019 |
| CN | 113159137 A | 7/2021 |
| CN | 113411361 A | 9/2021 |
| EP | 3628851 A1 | 4/2020 |
| WO | 2018174028 A1 | 9/2018 |

OTHER PUBLICATIONS

Roger, J.A., "fuzzy nearest neighbor neural network statistical model for predicting demand for natural gas and energy cost savings in public buildings", 2013, Expert Systems with Applications 41 (2014) 1813-1829. (Year: 2013).*
Zhu et al., "Short-term natural gas demand prediction based on support vector regression with false neighbours filtered", Jun. 2014, Energy 80 (2015). (Year: 2014).*
Notification to Grant Patent Right for Invention in Chinese Application No. 202211408774.9 dated Jan. 19, 2023, 8 pages.
Luo, Wenjin et al., Practice and Research of Gas Demand Forecast, Energy Conservation, 2016, 5 pages.
First Office Action in Chinese Application No. 202211408774.9 dated Dec. 16, 2022, 20 pages.

* cited by examiner

PRESET MANAGEMENT METHODS OF GAS PIPELINE NETWORK FOR SMART GAS AND INTERNET OF THINGS SYSTEMS THEREOF

CROSS-REFERENCE TO RELATED APPLICATIONS

This application claims priority of Chinese Patent Application No. 202211408774.9, filed on Nov. 11, 2022, the contents of which are hereby incorporated by reference to its entirety.

TECHNICAL FIELD

The present disclosure relates to the field of smart management of a gas pipeline network, and in particular to a preset management method of the gas pipeline network for a smart gas and an Internet of Things system.

BACKGROUND

The gas pipeline network is an important infrastructure for cities. The construction of the gas pipeline network varies in different regions of the city and needs to be planned and built according to region features. However, as urbanization accelerates and the number of newly developed communities increases, the gas pipeline network system becomes larger, and the management complexity and management costs for the gas pipeline network increase year by year.

Therefore, it is expected that a preset management method of the gas pipeline network for a smart gas and an Internet of Things system can be provided to achieve a smart management of the gas pipeline network and reduce management costs.

SUMMARY

One or more embodiments of the present disclosure provide a preset management method of a pipeline gas network for a smart gas, which is performed by a smart gas management platform. The smart gas management platform comprises a smart user service management sub-platform, a smart operation management sub-platform and a smart gas data center. The method comprises: obtaining, by the smart gas data center, a region feature of each region within a target range through a smart gas sensing network platform; determining, by the smart operation management sub-platform, a gas demand degree of the each region based on the region feature of the each region; determining, by the smart operation management sub-platform, a region as a first-class region based on the gas demand degree in the region meeting a preset condition, and determining a gas pipeline network opening scheme for the region.

One or more embodiments of the present disclosure provide an Internet of Things system for preset management of gas pipeline network for a smart gas. The system comprises a smart gas user platform, a smart gas service platform, a smart gas management platform, a smart gas sensing network platform and a smart gas object platform, and the smart gas management platform includes a smart user service management sub-platform, a smart operation management sub-platform and a smart gas data center. The smart gas management platform is configured to: obtain, by the smart gas data center, a region feature of each region within a target range through a smart gas sensing network platform; determine, by the smart operation management sub-platform, a gas demand degree of the each region based on the region feature of the each region; determine, by the smart operation management sub-platform, a region as a first-class region based on the gas demand degree in the region meeting a preset condition, and determine a gas pipeline network opening scheme for the region.

One or more embodiments of the present disclosure provide a non-transitory computer-readable storage medium, comprising a set of instructions, when executed by a processor, the above preset management method of gas pipeline network for a smart gas is implemented.

BRIEF DESCRIPTION OF THE DRAWINGS

This present disclosure will be further illustrated by way of exemplary embodiments, which will be described in detail by way of the accompanying drawings. These embodiments are not limiting, and in these embodiments the same numbering indicates the same structure, wherein.

DETAILED DESCRIPTION

Figure 1:
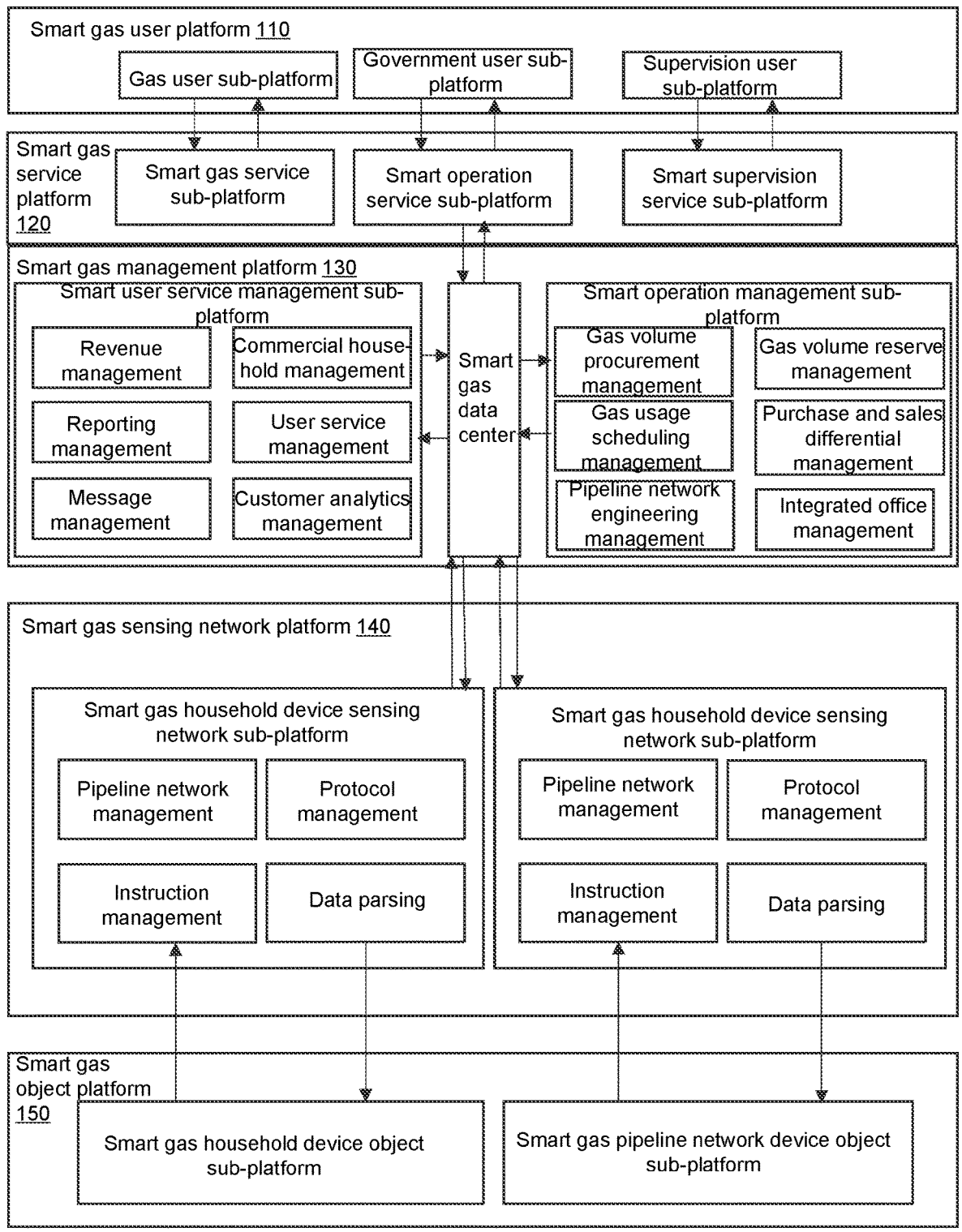
FIG. 1 is a schematic diagram illustrating a platform structure of an Internet of Things system for preset management of gas pipeline network for a smart gas according to some embodiments of this present disclosure.

The technical solutions of the present disclosure embodiments will be more clearly described below, and the accompanying drawings need to be configured in the description of the embodiments will be briefly described below. Obviously, the drawings in the following description are merely some examples or embodiments of the present disclosure. For those of ordinary skill in the art, the present specification can also be applied to the other similar scenarios according the drawings without having to pay creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating a platform structure of an Internet of Things system for preset management of a gas pipeline network for a smart gas according to some embodiments of this present disclosure.

As shown in FIG. 1, the Internet of Things system 100 for preset management of the gas pipeline network for a smart gas may include a smart gas user platform 110, a smart gas service platform 120, a smart gas management platform 130, a smart gas sensing network platform 140, and a smart gas object platform 150.

In some embodiments, the Internet of Things system 100 for preset management of the gas pipeline network for a smart gas may be applied to multiple application scenarios of gas management. In some embodiments, the Internet of Things system 100 for preset management of the gas pipeline network for a smart gas may obtain region feature of each region within a target range, and determine a gas demand degree of each region based on the region feature of each region, and determine a gas network opening scheme of the region based on whether the gas demand degree of the region meets a preset condition.

The multiple application scenarios of the gas management may include a gas management of a newly developed cell, a region of the city, etc. It should be noted that the above scenarios are only examples and do not limit the specific application scenarios of the Internet of Things system 100 for preset management of the gas pipeline network for a smart gas, and a person skilled in the art may apply the Internet of Things system 100 for preset management of the gas pipeline network for a smart gas to any other suitable scenarios based on what is disclosed in this embodiment.

The Internet of Things system 100 for preset management of the gas pipeline network for a smart gas will be described specifically below.

The smart gas user platform 110 may be a user-oriented service interface, which may be configured as a terminal device. In some embodiments, the smart gas user platform 110 may include a gas user sub-platform, a government user sub-platform, and a supervision user sub-platform.

The gas user sub-platform may be a sub-platform for gas users. The gas users are the consumers of gas. For example, the gas users may be users who actually use gas. In some embodiments, the gas user sub-platform may correspond to and interact with the smart gas service sub-platform. For example, the gas user sub-platform may obtain services for safe gas usage from the smart gas service sub-platform, etc.

The government user sub-platform may be a sub-platform that targets government users and provides data related to gas operations for government users. In some embodiments, the government user sub-platform may correspond to and interact with the smart operation service sub-platform. For example, the government user sub-platform may obtain services of gas operations from the smart operation service sub-platform.

The supervision user sub-platform may be a sub-platform that targets the supervision users and supervise the operation of the whole Internet of Things system. The supervision users are the users of the security department. In some embodiments, the supervision user sub-platform may correspond to and interact with the smart supervision service sub-platform. For example, the supervision user sub-platform may obtain services required by safety supervision from the smart supervision service sub-platform.

In some embodiments, the smart gas user platform 110 may receive information from users. For example, the smart gas user platform 110 may receive a pipeline network project management information query instruction from government users. In some embodiments, the smart gas user platform 110 may feedback information to the users. For example, the smart gas user platform 110 may feedback pipeline network project management information to the government users.

In some embodiments, the smart gas user platform 110 may interact with the smart gas service platform 120. For example, the government user sub-platform may send the pipeline network project management information query instruction to the smart operation service sub-platform. As another example, the government user sub-platform may receive the pipeline network project management information uploaded by the smart operation service sub-platform.

The smart gas service platform 120 may be a platform for providing input and output services to the users. In some embodiments, the smart gas service platform 120 may include a smart gas service sub-platform, a smart operation service sub-platform, and a smart supervision service sub-platform.

In some embodiments, the smart gas service sub-platform may correspond to the gas user sub-platform to provide the gas device-related information for gas users. The smart operation service sub-platform may correspond with the government user sub-platform to provide gas operation-related information for the government users. The smart supervision service sub-platform may correspond with the supervision user sub-platform to provide supervision management-related information for the supervision users.

In some embodiments, the smart gas service platform 120 may interact with the gas smart management platform 130. For example, the smart operation service sub-platform may send the pipeline network project management information query instruction to the smart gas data center. As another example, the smart operation service sub-platform may receive the pipeline network project management information uploaded by the smart gas data center.

The smart gas management platform 130 may refer to the Internet of Things (loT) platform that overall plans and coordinates the connection and collaboration between functional platforms and provides sensing management and control management. In some embodiments, the smart gas management platform 130 may include a smart user service management sub-platform, a smart operation management sub-platform, and a smart gas data center. In some embodiments, the smart user service management sub-platform and the smart operation management sub-platform are independent of each other, and the smart user service management sub-platform and the smart operation management sub-platform are data usage platforms that do not store data. In some embodiments, the smart gas data center aggregates and stores all operational data of the system. In some embodiments, the smart user service management sub-platform and the smart operation management sub-platform interact with the smart gas data center in both directions, respectively. For example, the smart user service management sub-platform and the smart operation management sub-platform obtain related data from the smart gas data center respectively. As another example, the smart user service management sub-platform and the smart operation management sub-platform send management and operation data to the smart gas data center respectively.

In some embodiments, the smart user service management sub-platform may include a revenue management module, an Industrial and commercial household management module, a reporting management module, a user service management module, a message management module, and a customer analytics management module. In some embodiments, the smart operation management sub-platform may include a gas volume procurement management module, a gas volume reserve management module, a gas usage scheduling management module, a purchase and sales differential management module, a pipeline network engineering management module, and an integrated office management module. The pipeline network project management module may be responsible for the planning, arrangement of manpower and material resources, etc. for the construction of pipeline network projects.

In some embodiments, the smart gas management platform 130 may interact with the smart gas service platform 120 and the smart gas sensing network platform 140, respectively. The smart gas management platform 130 may interact with the smart gas service platform 120 and the smart gas sensing network platform 140, respectively through the smart gas data center. For example, the smart gas data center may receive the pipeline network project management information query instruction sent by the smart gas service platform 120. As another example, the smart gas data center may send an instruction for obtaining data related to pipeline network project management to the smart gas sensing network platform 140. As another example, the smart gas data center may receive the data related to pipeline network management uploaded by the smart gas sensing network platform 140. The data related to pipeline network project management may include the size, activity, gas demand degree, and related features of similar existing regions of the region's population.

In some embodiments, the smart gas data center sends the received data related to pipeline network engineering management to the smart operation management sub-platform for processing and analysis. The smart operation management sub-platform sends the analyzed and processed data to the smart gas data center. The smart gas data center sends the aggregated, processed data to the smart gas service platform 120. The sent data may include the pipeline network opening scheme (opening time, arrangement of manpower and material resources, etc.), etc.

The smart gas sensing network platform 140 may be a platform that enables the connection between the smart gas management platform and the smart gas object platform for interaction, which may be configured as a communication network and gateway. In some embodiments, the smart gas sensing network platform 140 may include a smart gas household device sensing network sub-platform and a smart gas network device sensing network sub-platform.

In some embodiments, the smart gas household device sensing network sub-platform may include a pipeline network management module, a protocol management module, an instruction management module, and a data parsing module. In some embodiments, the smart gas household device sensing network sub-platform may correspond to the smart gas household device object sub-platform. The smart gas household device sensing network sub-platform may receive data related to the gas household device uploaded by the smart gas household device object sub-platform.

In some embodiments, the smart gas network device sensing network sub-platform may include a pipeline network management module, a protocol management module, an instruction management module, and a data parsing module. In some embodiments, the smart gas network device sensing network sub-platform may correspond to the smart gas network device object sub-platform. The smart gas network device sensing network sub-platform may receive data related to the pipeline network device uploaded by the smart gas network device object sub-platform.

In some embodiments, the smart gas sensing network platform 140 may interact with the smart gas object platform 150. For example, the smart gas sensing network platform 140 may receive data related to the gas household device and/or the network device uploaded by the smart gas object platform 150. As another example, the smart gas sensing network platform 140 may send an instruction for obtaining data related to the gas household device and/or an instruction for obtaining data related to the network device to the smart gas object platform 150.

The smart gas object platform 150 may be a functional platform for generating sensing information and finally executing control information, which may be configured as various types of gas devices. The gas device may include a household device and a pipeline network device. For example, the household device may be a gas terminal (e.g., a gas meter) of a gas user. As another example, the pipeline network device may be a certain gate station, various segments of gas transmission pipelines, gas valve control device, etc. In some embodiments, the smart gas object platform 150 may include a smart gas household device object sub-platform and a smart gas pipeline network device object sub-platform.

In some embodiments, the smart gas household device object sub-platform may correspond to the smart gas household device sensing network sub-platform. The smart gas household device object sub-platform may upload data related to the gas household device to the smart gas data center through the gas household device sensing network sub-platform.

In some embodiments, the smart gas pipeline network device object sub-platform may correspond to the smart gas pipeline network device sensing network sub-platform. The smart gas pipeline network device object sub-platform may upload data related to the gas pipeline network device to the smart gas data center through the gas pipeline network device sensing network sub-platform.

In some embodiments, the smart gas object platform 150 may interact with the smart gas sensing network platform 140. For example, the smart gas object platform 150 may receive an instruction for obtaining data related to the gas device from the smart gas sensing network platform 140. As another example, the smart gas object platform 150 may upload data related to the gas device to the corresponding smart gas sensing network platform.

In some embodiments, the data uploaded by the smart gas object platform 150 is processed and analyzed by the smart gas sensing network platform 140 and the smart gas management platform 130 and then stored in the smart gas data center.

After the smart gas management platform receives the pipeline network project management information query instruction from the smart gas service platform again, the smart gas management platform may obtain the related data directly in the smart gas data center.

It is possible for a person skilled in the art, with an understanding of the principle of the system, to adapt the Internet of Things system 100 for preset management of the gas pipeline network for a smart gas to any other suitable scenario without departing from this principle.

It should be noted that the above descriptions of the Internet of Things system for preset management of the gas pipeline network for a smart gas and its modules are for descriptive convenience only and do not limit the present disclosure to the scope of the cited embodiments. It can be understood that it is possible for a person skilled in the art, with an understanding of the principle of the system, to make any combination of modules or form sub-systems to connect to other modules without departing from this principle.

Figure 2:
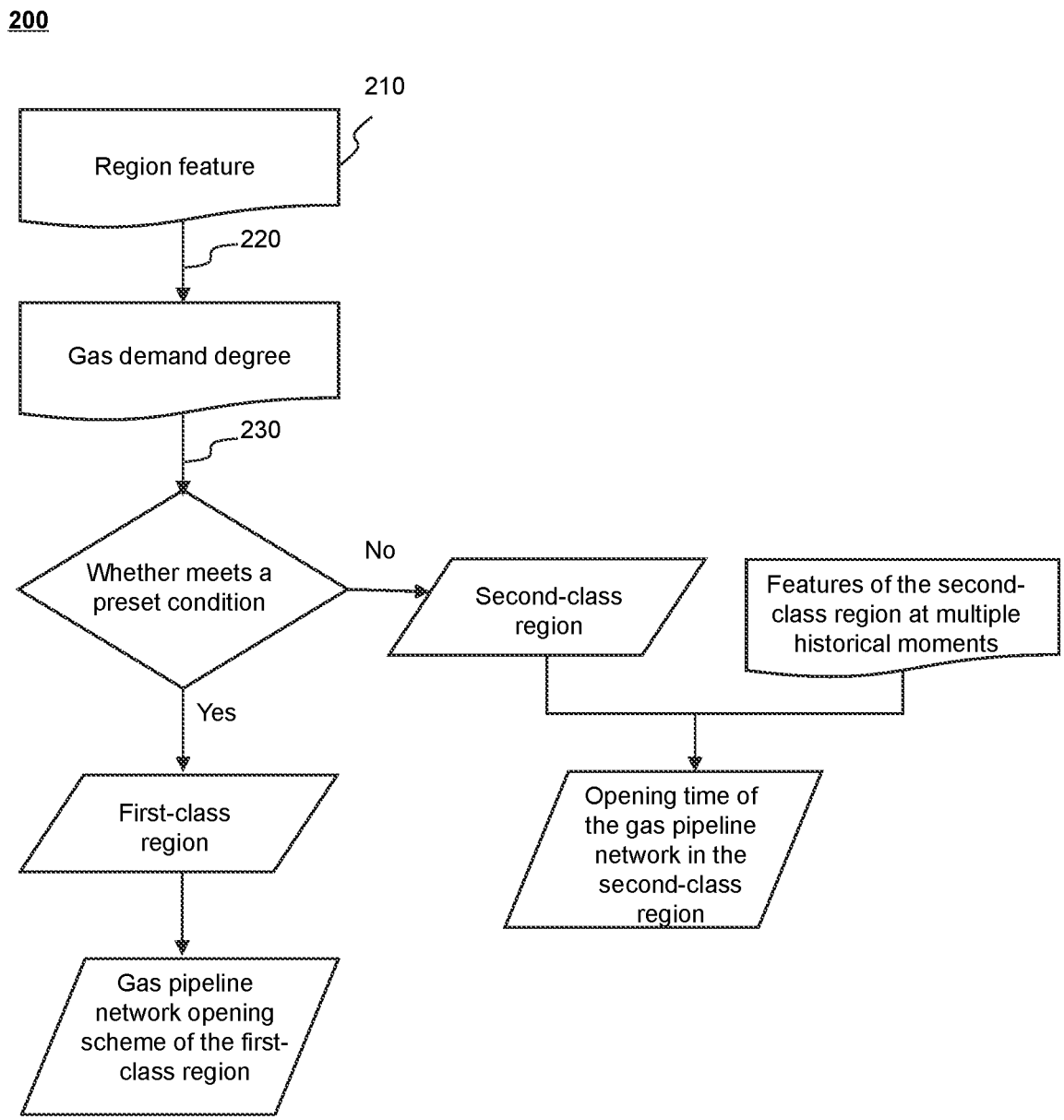
FIG. 2 is an exemplary flowchart illustrating a preset management method of the gas pipeline network for a smart gas according to some embodiments of the present disclosure.

FIG. 2 is an exemplary flowchart illustrating a preset management method of the gas pipeline network for a smart gas according to some embodiments of the present disclosure. In some embodiments, the process 200 may be performed by the smart gas management platform 130. As shown in FIG. 2, the process 200 includes the following steps.

Step 210, obtaining region feature of each region within a target range through a smart gas sensing network platform.

The target range may be the management range corresponding to smart gas management platform 130, for example, a particular city, or a region of a city.

The region feature may refer to information about the feature associated with a region within the target range, such as the number of people, the type of users, the number of cells, etc. in the region. In some embodiments, the region feature may include the number and size of newly developed cells and population activity in the region.

The size of the newly developed cells may be determined based on the number of residential households and building area of each newly developed cell. For example, the size of a newly developed cell may be classified based on the number of residential households and building area of each newly developed cell. Exemplarily, the size of a newly developed cell may be classified as three levels A, B and C in order (A>B>C). When the number of residential households is larger than 100 and smaller than or equal to 200, and/or building area is larger than 0 m² and smaller than or equal to 500 m² in a newly developed cell, the size of a newly developed cell may be classified as level C. When the number of residential households is larger than 200 and smaller than or equal to 500, and/or building area is larger than 500 m² and smaller than or equal to 1000 m² in a newly developed cell, the size of the cell may be classified as level B. When the number of residential households is larger than 500, and/or building area is larger than 1000 m² in a newly developed cell, the size of the cell may be classified as level A.

It should be noted that the above-mentioned classification of newly developed cells is only an example and can be applied in a more detailed manner according to the actual situation; the size of the newly developed cells may also be determined in other ways based on the number of residential households and building area of the newly developed cells, and this present disclosure does not limit this too much.

The population activity may be used to reflect the number of permanent residents in a newly developed cell.

The population activity may be determined in a variety of ways. In some embodiments, the population activity may be determined by counting the number of people entering and exiting during the day based on the cameras at the entrance of each newly developed cell. For example, the video and/or images captured by the camera may be obtained based on the cameras at the entrance of each newly developed cell, and the video and/or images may be analyzed using an algorithmic model to count the number of people entering and exiting the cell during the day. The algorithmic model may be a machine learning model, such as a convolutional neural network, etc.

In some embodiments, the population activity may also be determined by counting the number of people entering and exiting during a day based on the access control system of each newly developed cell. For example, the user swipes the access control card when entering or exiting each time, and the access control system counts once to count the number of people entering and exiting the cell in a day.

The region feature may be obtained in a variety of ways. In some embodiments, the region feature may be obtained based on a third-party platform. For example, the number and size of newly developed cells may be obtained through the Housing and Urban-rural Development Bureau, and the population activity may be obtained through the property system and/or access control system of newly developed cells.

Step 220, determining a gas demand degree of each region based on the region feature of each region.

In some embodiments, the target range may include at least one region, and the smart gas management platform 130 may determine the corresponding gas demand degree of each region within the target range based on the region feature of the region.

The gas demand degree may be the total amount of gas required for a region within the target range.

The gas demand degree of each region may be determined in a variety of ways. In some embodiments, the gas demand degree of each region may be calculated based on a preset method. The preset method may be a calculation method that is pre-recorded into the system, for example, the gas demand degree=number of newly developed cells x average size x average population activity x per capita demand. The per capita demand may be a preset value, which may be determined based on historical data, etc. For example, the actual per capita demand of the cell in the historical data may be determined as the per capita demand of the newly developed cells when the number and size of cells and the population activity in the historical data are similar to that of the newly developed cells.

In some embodiments, the gas demand degree of each region may also be determined based on a gas demand degree prediction model. An input of the gas demand degree prediction model may include the region feature of the region, and an output of the gas demand degree prediction model may include the gas demand degree of the region. For more information about the gas demand degree prediction model, please refer to FIG. 3 and its related description.

Step 230, determining a region as a first-class region based on the gas demand degree in the region meeting a preset condition, and determining a gas pipeline network opening scheme for the region.

The preset condition may be a condition that is preset in the system. For example, the preset condition may be that when the gas demand degree of the region is greater than a gas demand degree threshold, an opening of gas is determined, etc. The gas demand degree threshold may also be a preset value, which may be determined based on experience or using algorithms, etc.

The first-class region may be the region where gas may be opened.

In some embodiments, the first-class region may be determined based on whether the gas demand degree meets the preset condition, and if the gas demand degree of the region meets the preset condition, the region is determined to be a first-class region.

The gas pipeline network opening scheme may refer to the series of measures taken to open the gas pipeline network. For example, arrangements are made for manpower, material, gas pressure regulation, safety inspection, etc.

The gas pipeline network opening scheme may be determined in a variety of ways. In some embodiments, the gas pipeline network opening scheme may be determined using a preset procedure based on the region feature of each first-class region. The preset procedure may be a procedure that is preset in the system. For example, when the number of residential households is larger than 1 and smaller than or equal to 5 in a newly developed cell, 3 people may be assigned to carry out the relevant processing; when the number of residential households is larger than or equal to 5 and smaller than 10 in a newly developed cell, 6 people may be assigned to carry out the relevant processing, etc.

In some embodiments, the preset management method of the gas pipeline network may further include: determining a region as a second-class region in the target range where the gas demand degree does not meet the preset condition, and obtaining features of the second-class region at multiple historical moments to predict an opening time of the gas pipeline network in the second-class region.

The second-class region may be the region that temporarily does not meet the condition of gas opening.

In some embodiments, the second-class region may be determined based on whether the gas demand degree meets the preset condition, and if the gas demand degree of the region does not meet the preset condition, the region is determined to be a second-class region.

The features of the second-class region at multiple historical moments may refer to the number and size of newly developed cells and population activity at the multiple historical moments. The multiple historical moments may refer to historical moments with a certain time interval, which may be a week, a month, or a year, without too much restriction.

The features of the second-class region at the multiple historical moments may be obtained in a variety of ways. In some embodiments, the number and size of newly developed cells in the second-class region may be obtained based on a camera device (e.g., a drone, etc.); the number of people entering and exiting each cell at multiple historical moments is counted based on the camera at the entrance of each cell in the second-class region, and then the population activity of the second-class region at the multiple historical moments is determined.

The opening time of the gas pipeline network in the second-class region may be determined in a variety of ways. In some embodiments, the gas demand degree of each second-class region at multiple moments may be obtained, and the opening time of the gas pipeline network of the second-class region may be determined by an interpolation method.

The gas demand degree at the multiple moments may be determined by using various methods. In some embodiments, the gas demand degree of each second-class region at the multiple historical moments may be determined by obtaining the features of the second-class region at the multiple historical moments based on a preset method, for example, the gas demand degree at the multiple historical moments=the number of newly developed cells at the multiple historical moments x the average size at the multiple historical moments x the average population activity at the multiple historical moments x the per capita demand. In some embodiments, the gas demand degree at multiple moments may also be predicted by a gas demand degree prediction model. For more information about the gas demand degree model, please see FIG. 3 and its related description.

The interpolation method may be arbitrary, such as linear interpolation, cubic spline interpolation, etc. Specifically, a curve (i.e., the moment-gas demand degree curve) may be formed by the interpolation method based on the multiple historical moments and the gas demand degree at the multiple historical moments, and the horizontal coordinate of the opening point corresponding to a demand degree threshold may be used as the predicted opening time based on the gas demand degree threshold and the moment-gas demand degree curve. The dashed segment of the curve is a forecast of the future trend.

In some embodiments, the opening time of the gas pipeline network of the second-class region may also be predicted based on an opening time prediction model. For more information about the opening time prediction model, please refer to FIG. 5 and its related description.

In some embodiments of this present disclosure, the calculation of the gas demand degree may be made more accurate by determining the gas demand degree of each cell based on three dimensions of the number and size of newly developed cells and the population activity in each region. A region is classified based on whether the gas demand degree of a certain region meets the preset condition, and the gas pipeline network opening scheme of the first-class region is determined, which not only facilitates the management of the region within the target range, but also improves the management efficiency. The interpolation method and the opening time prediction model are used to predict the opening time of the gas pipeline network in the second-class region, which helps to deploy and schedule resources in advance and save management costs.

Figure 5:
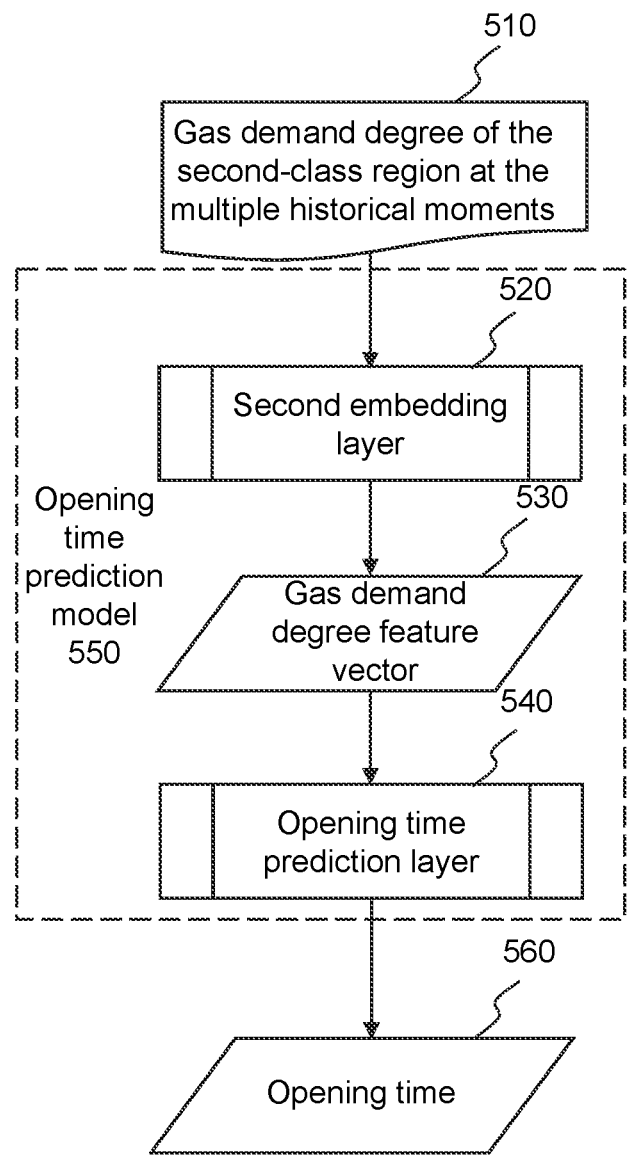
FIG. 5 is a schematic diagram illustrating a gas opening time prediction model according to some embodiments of this present disclosure.

For more information, please refer to FIG. 5 and its related description.

It should be noted that the above description of the process 200 is for example and illustration purposes only, and does not limit the scope of application of this present disclosure. For those skilled in the art, various amendments and changes can be made to the process 200 under the guidance of this present disclosure. However, these amendments and changes remain within the scope of this present disclosure.

Figure 3:
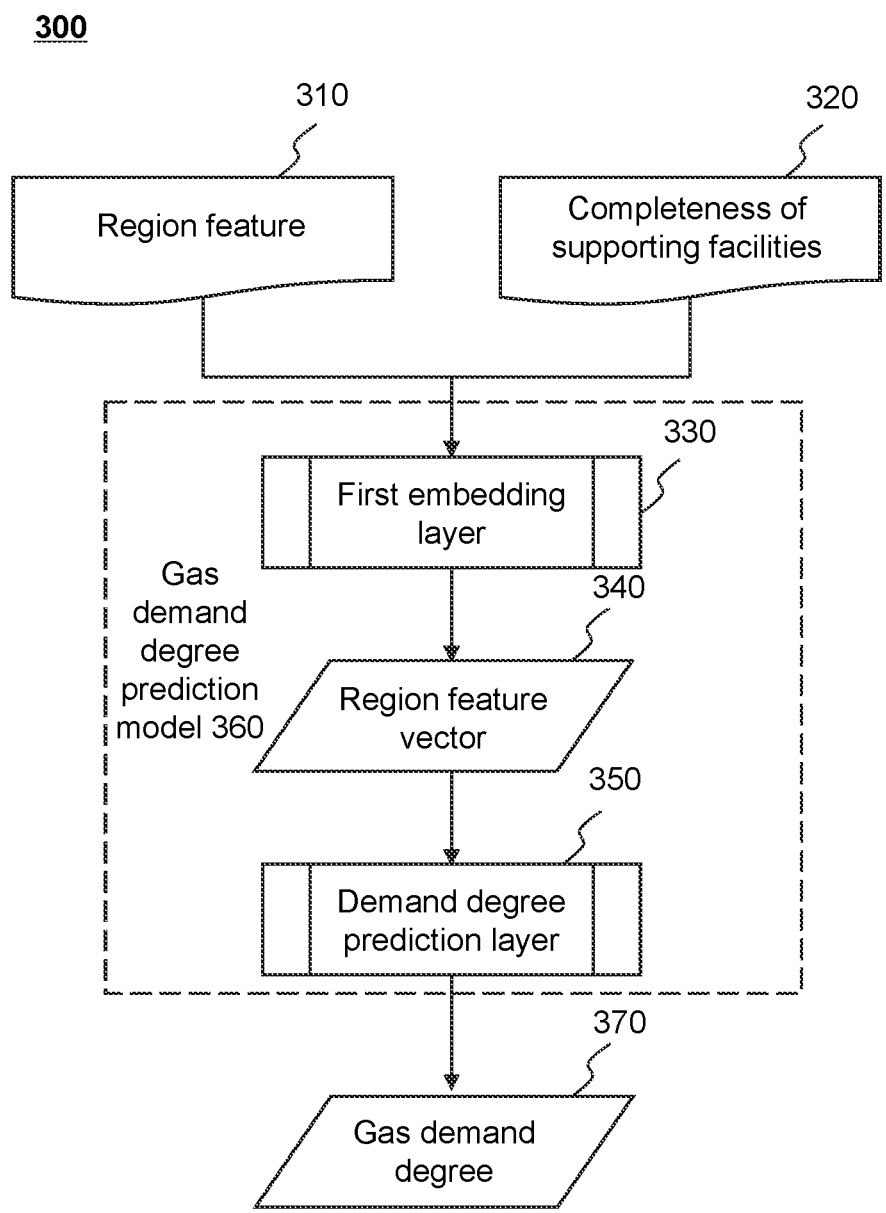
FIG. 3 is a schematic diagram illustrating a gas demand degree prediction model according to some embodiments of this present disclosure.

FIG. 3 is a schematic diagram illustrating a gas demand degree prediction model according to some embodiments of this present disclosure.

In some embodiments, the smart gas management platform 130 may determine the gas demand degree of each region based on the region feature through a gas demand degree prediction model.

In some embodiments, the gas demand degree prediction model 360 may include a Neural Networks (NN) model, a Convolutional Neural Networks (CNN) model, a Recurrent Neural Network (RNN) model, etc.

In some embodiments, an input of the gas demand degree prediction model 360 may include region feature 310. The region feature 310 may be the region feature of a region within the target range. For more information about the region feature, please refer to step 210 and its related description. An output of the gas demand degree prediction model 360 may include a gas demand degree 370. The gas demand degree is the degree of gas demand in the above region. For more information about the gas demand degree, please refer to step 220 and its related description.

In some embodiments, an input of the gas demand degree prediction model 360 may also include a completeness of supporting facilities 320.

The completeness of supporting facilities refers to the number of different infrastructures around the newly developed cells. For example, the completeness of supporting facilities may include the number of supermarkets, schools, hospitals, restaurants, subway entrances, etc. around a newly developed cell.

In some embodiments, the smart gas management platform 130 may obtain the number of various infrastructures around a newly developed cell by obtaining map data from third-party software to determine the completeness of supporting facilities. For example, the smart gas management platform 130 may determine the number of supermarkets, schools, hospitals, restaurants, subway entrances, etc. around a newly developed cell by obtaining map data, and the number of various infrastructures is summed up according to weights to obtain the completeness of supporting facilities of that newly developed cell. The weights of the various infrastructures may be set artificially.

In some embodiments of this present disclosure, the accuracy of the final determined gas demand degree is effectively improved by calculating in various aspects by taking the completeness of supporting facilities as an input of the gas demand degree prediction model, and taking supermarkets, schools, hospitals, restaurants, subway entrances, etc. around the cell according to certain weights into the reference quantity.

In some embodiments, the gas demand degree prediction model 360 may include a first embedding layer 330 and a demand degree prediction layer 350. In some embodiments, the region feature 310, the input of the gas demand degree prediction model 360, pass through the first embedding layer 330 and the demand degree prediction layer 350 to output the gas demand degree 370.

The first embedding layer 330 may be a model for extracting a region feature vector. In some embodiments, the first embedding layer 330 may include a deep neural network model, etc.

In some embodiments, an input of the first embedding layer 330 may include the region feature 310; an output of the first embedding layer 330 may include a region feature vector 340.

The region feature vector is a feature vector that reflects information about any feature in the region. For example, the elements in the region feature vector may include arbitrary features such as the number and size of newly developed cells and population activity in the region.

The demand degree prediction layer 350 may be a model for determining the gas demand degree. In some embodiments, the demand degree prediction layer 350 may include a deep neural network model, etc.

In some embodiments, an input of the demand degree prediction layer 350 may include the region feature vector 340 output by the first embedding layer 330; an output of the demand degree prediction layer 350 may include the gas demand degree 370.

In some embodiments, the first embedding layer 330 and the demand degree prediction layer 350 may be obtained by joint training.

In some embodiments, the sample data of the joint training may include data related to a region where gas has been opened, and the label may include the actual gas usage of the region. In some embodiments, the actual gas usage volume of the region may be used directly as a label. In some embodiments, the actual gas usage volume of the region may also be used as a label after dimensionless processing.

In some embodiments, the sample region feature is input to the initial first embedding layer to obtain the region feature vector output from the initial first embedding layer, and the region feature vector output from the initial first embedding layer is used as the input of the initial demand degree prediction layer, and the gas demand degree is obtained after the processing of the initial demand degree prediction layer. A loss function is constructed based on the sample gas demand degree and the gas demand degree output from the initial demand degree prediction layer, and the first embedding layer and the demand degree prediction layer are updated simultaneously. The trained first embedding layer and the trained demand degree prediction layer are obtained by updating parameter.

In some embodiments of this present disclosure, the gas demand degree of each region is determined by the gas demand degree prediction model based on the region feature, which not only can effectively improve the accuracy of the final determined gas demand degree, but also can reduce the time required to determine the gas demand degree.

Figure 4:
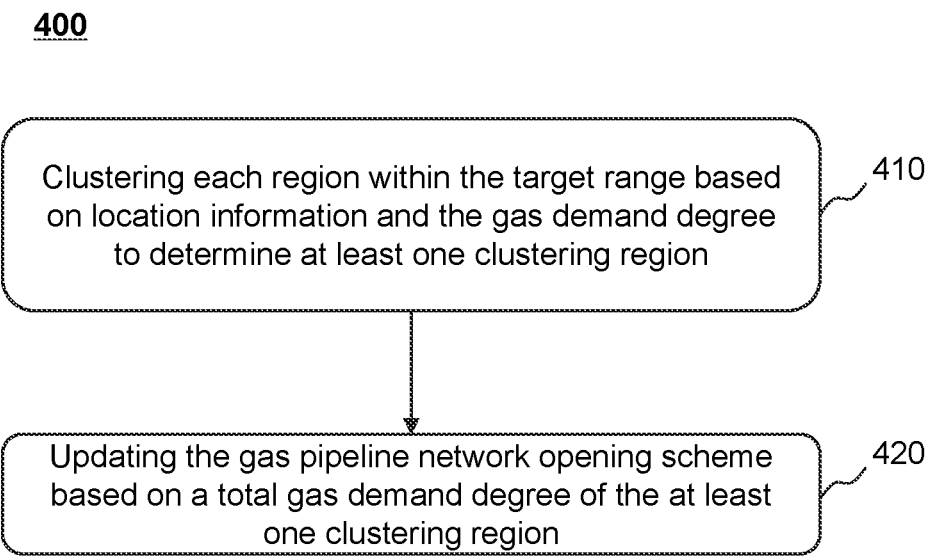
FIG. 4 is another exemplary flowchart illustrating a preset management method of the gas pipeline network for a smart gas according to some embodiments of the present disclosure.

FIG. 4 is another exemplary flowchart illustrating a preset management method of the gas pipeline network for a smart gas according to some embodiments of the present disclosure. In some embodiments, the process 400 may be performed by the smart gas management platform. As shown in FIG. 4, the process 400 includes the following steps.

Step 410, clustering each region within the target range based on location information and the gas demand degree to determine at least one clustering region.

The location information is the geographical location information of each region. For example, the location information may be the latitude and longitude coordinates of the region and the area of the region.

The clustering region may include one or more regions. In some embodiments, the clustering region may represent a type of region within the target range.

In some embodiments, the smart gas management platform 130 may cluster each region within the target range by means of a clustering algorithm to determine a clustering region. In some embodiments, the clustering algorithm may include, but is not limited to, a k-means clustering algorithm and/or a Density-Based Spatial Clustering of Applications with Noise (DBSCAN) algorithm, etc. In some embodiments, when the clustering algorithm is a k-mean clustering algorithm, the method for determining the k-value may be the elbow method. In some embodiments, when the clustering algorithm is a k-mean clustering algorithm, the method of determining the k-value may also be to take k=1, 2, 3 in turn until the obtained concentration of the k clusters meets a preset condition. The concentration may be determined based on the average distance of all vectors in a cluster; and the preset condition may be an artificially preset value.

In some embodiments, the smart gas management platform 130 may also use k regions of all regions within the target range as initial clustering centers $a_1, a_2, \ldots ak$. k may be determined based on manual setting. Then the distances between the other regions within the target range and the k initial clustering centers are calculated separately, and the sample is assigned to the class corresponding to the initial clustering center with the smallest distance. When calculating the distance between other regions within the target range and the k initial clustering centers, it may be determined based on the proximity of the location of the region to the initial clustering center and the proximity of the gas demand of the region to the initial clustering center.

For example, the latitude and longitude coordinates of the region are $(p_i, q_i)$ and the gas demand degree is $m_i$; the latitude and longitude coordinates of the initial clustering center $a_1$ are $(p_i, q_1)$ and the gas demand degree is $m_1$. Then the distance of the region to the initial clustering center $a_1$ may be calculated by using the formula sprt $[(P_i-p_1)^2+(q_i-q_1)^2+(m_i-m_1)^2]$.

For each class $a_j$, the clustering centers need to be recalculated again using the formula $$a_j = \frac{1}{|c_i|}\sum\nolimits_{x\in c_i} x.$$

The above two steps of calculating the distance and calculating the clustering center may be repeated until the preset condition is met. The preset condition may include the number of iterations reaching a threshold, the minimum error change being less than a threshold, etc. The threshold may be set artificially.

Step 420, updating the gas pipeline network opening scheme based on a total gas demand degree of the at least one clustering region.

The total gas demand degree is the sum of the gas demand degrees of all regions in the clustering region.

In some embodiments, the smart gas management platform 130 may first determine the gas demand degree of each region in the clustering region, and then sum the gas demand degree of each region to obtain the total gas demand degree of the clustering region. For more information about determining the gas demand degree of each region please refer to step 220 and its related description.

In some embodiments, the gas pipeline network opening scheme of the clustering region is determined based on whether the total gas demand degree of the clustering region meets a preset condition. The preset condition may be that the total gas demand degree of the clustering region is greater than a total gas demand degree threshold. The total gas demand degree threshold may be set artificially based on experience. For more information about determining the gas pipeline network opening scheme, please refer to step 230 and its related instructions.

In some embodiments of this present disclosure, the clustering region is determined by clustering all regions within the target range, and the gas pipeline network opening scheme is determined based on the total gas demand degree of the clustering region. The unified arrangement and adjustment of manpower, materials, gas pressure regulation and safety inspection can be realized, which helps reduce management costs.

FIG. 5 is a schematic diagram illustrating a gas opening time prediction model according to some embodiments of this present disclosure.

In some embodiments, the opening time of the gas pipeline network of the second-class region may be predicted based on the opening time prediction model.

The opening time prediction model may be used to predict the opening time of the gas pipeline network. In some embodiments, the opening time prediction model may be a machine learning model, for example, Convolutional Neural Networks (CNN), Recurrent Neural Network (RNN), etc.

In some embodiments, the opening time prediction model may process the gas demand degree of the second-class region at the multiple historical moments to determine the opening time. As shown in FIG. 5, the opening time prediction model 550 may include a second embedding layer 520 and an opening time prediction layer 540.

In some embodiments, the second embedding layer 520 may process the gas demand degree 510 of the second-class region at the multiple historical moments to determine the gas demand degree feature vector 530. The input of the second embedding layer 520 may include the gas demand degree 510 of the second-class region at the multiple historical moments, and the output of the second embedding layer 520 may include the gas demand degree feature vector 530. The gas demand degree feature vector 530 may be a vector form of the gas demand degree feature. For example, if the historical moment is December 2020, the correspond gas demand degree is 900 $Nm^3$, the gas demand feature vector may be expressed as (2020, 12, 900).

In some embodiments, the opening time prediction layer 540 may process the gas demand degree feature vector 530 to determine the opening time 550. The input of the opening time prediction layer 540 may include the gas demand degree feature vector 530, and the output of the opening time prediction layer 540 may include the opening time 550.

In some embodiments, the output of the second embedding layer 520 may be the input of the opening time prediction layer 540, and the second embedding layer 520 and the opening time prediction layer 540 may be obtained by joint training.

In some embodiments, the joint trained sample data includes sample gas demand degrees of region at the multiple historical moments where the gas has been opened, label is with the sample opening time corresponding to the sample gas demand degrees at the multiple historical moments. The label may be obtained by manual annotation.

In some are examples, the sample gas demand degrees of region at the multiple historical moments where gas has been opened are input into the initial second embedding layer to obtain the gas demand degree feature vector output from the initial second embedding layer; the gas demand degree feature vector is used as training sample data and input to the initial opening time prediction layer to obtain the opening time output from the initial opening time prediction layer. The loss function is constructed based on the sample opening time and the opening time output from the initial opening time prediction layer, and the parameters of the initial second embedding layer and the parameters of the initial opening time prediction layer are updated simultaneously. The trained second embedding layer 520 and the trained opening time prediction layer 540 are obtained by updating parameter.

In some embodiments, the uniform opening time of the gas pipeline network in the clustering region may also be predicted based on the opening time prediction model 550.

The clustering region may include at least one region. In some embodiments, the clustering region is used to indicate a type of region within the target range, such as an industrial region, a commercial region, etc. For more information about the clustering region, please refer to FIG. 4 and its related description.

In some embodiments, the opening time prediction model 550 may process the total gas demand degree of the clustering region to determine a uniform opening time.

In some embodiments, the second embedding layer 520 may process the total gas demand degree of the clustering region to determine the total gas demand degree feature vector. The input of the second embedding layer 520 may include the total gas demand degree of the clustering region, and the output of the second embedding layer 520 may include the total gas demand degree feature vector.

The total gas demand degree may be the sum of the gas demand degrees of each region in the clustering region. In some embodiments, the total gas demand degree of the clustering region may be calculated by using a weighted summation method. The weight of the weighted sum may be determined based on the completeness of supporting facilities of each region in the clustering region, and the complete the supporting facilities is, the greater the corresponding weight is.

The total gas demand degree feature vector may be the vector form of the total gas demand degree feature. For example, the clustering region is an industrial region, a commercial region, and a residential region, which may be marked by 1, 2, and 3, respectively. When the clustering region is an industrial region and its total gas demand degree is 5000 $Nm^3$, its feature vector may be expressed as (1, 5000).

In some embodiments, the opening time prediction layer 540 may process the total gas demand degree feature vector to determine a uniform opening time. The input of the opening time prediction layer 540 may include the total gas demand degree feature vector, and the output of the opening time prediction layer 540 may include the uniform opening time.

In some embodiments of the present disclosure, the prediction of the opening time of the gas pipeline network of the second-class region by using a trained opening time prediction model can improve the accuracy of the prediction of opening time. The trained opening time prediction model is used to predict the opening time of the gas pipeline network in the clustering region to determine the uniform opening time, which is conducive to the Internet of Things system for better management of the gas pipeline network of the second-class region and saves management costs.

The basic concepts have been described above, apparently, for those skilled in the art, the above detailed disclosure is only an example, and does not constitute limitations of the specification. Although there is no clear explanation here, those skilled in the art may make various modifications, improvements, and modifications of present disclosure. This type of modification, improvement, and corrections are recommended in present disclosure, so the modification, improvement, and the amendments remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not configured to define the order of the present disclosure processes and methods. Although some examples of the invention currently considered useful in the present invention are discussed in the above disclosure, it should be understood that the details will only be described, and the appended claims are not limited to the disclosed embodiments. The requirements are designed to cover all modifications and equivalents combined with the substance and range of the present disclosure. For example, although the implementation of various components described above may be embodied in a hardware device, it may also be implemented as a software only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, the documents that limit the widest range of claims in the present disclosure (currently or later attached to the present disclosure) are also excluded. It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described.

What is claimed is:

1. A preset management method of gas pipeline network for a smart gas, which is performed by a smart gas management platform, the smart gas management platform comprising a smart user service management sub-platform, a smart operation management sub-platform and a smart gas data center, the method comprising:
   obtaining, by the smart gas data center, a region feature of each region within a target range through a smart gas sensing network platform;
   determining, by the smart operation management sub-platform, a gas demand degree of the each region based on the region feature of the each region; and
   clustering, by the smart operation management sub-platform, the each region within the target range based on location information and the gas demand degree to determine at least one clustering region;
   determining, by the smart operation management sub-platform, the region as a first-class region based on a total gas demand degree in a clustering region meeting a preset condition, and determining a gas pipeline network opening scheme of the first-class region using a preset procedure based on a region feature of the first-class region; wherein the total gas demand degree of the clustering region is determined by weighting the gas demand degree of each region of the clustering region; and a weighted weight is related to a completeness of supporting facilities of the each region;
   determining, by the smart operation management sub-platform, a clustering region as a second-class region within the target range of which the gas demand degree does not meet the preset condition, and determining a uniform opening time of gas pipeline network in the second-class region by processing the total gas demand degree of the second-class region through an opening time prediction model, wherein the opening time prediction model includes a second embedding layer and an opening time prediction layer, the second embedding layer processes the total gas demand degree to determine a total gas demand degree feature vector, and the opening time prediction layer processes the total gas demand degree feature vector to determine the uniform opening time of the gas pipeline network in the second-class region; and the opening time prediction model is a machine learning model.

2. The method of claim 1, wherein the method further includes:
   transmitting, by the smart operation management sub-platform, the gas pipeline network opening scheme to the smart gas data center;
   transmitting, by the smart gas data center, the gas pipeline network opening scheme to a smart gas service platform; and
   transmitting, by the smart gas service platform, the gas pipeline network opening scheme to a smart gas user platform.

3. The method of claim 1, wherein the method further includes:
   transmitting, by the smart gas data center, the gas pipeline network opening scheme to a smart operation service sub-platform of the smart gas service platform; and
   transmitting, by the smart operation service sub-platform, the gas pipeline network opening scheme to a government user sub-platform of the smart gas user platform.

4. The method of claim 1, wherein the determining a gas demand degree of the each region based on the region feature of the each region includes:
   determining the gas demand degree of the each region based on a gas demand degree prediction model, wherein an input of the gas demand degree prediction model includes the region feature of the region, and an output of the gas demand degree prediction model is the gas demand degree of the region.

5. The method of claim 4, wherein an input of the gas demand degree prediction model further includes the completeness of supporting facilities.

6. A non-transitory computer-readable storage medium, comprising a set of instructions, wherein when executed by a processor, the preset management method of a gas pipeline network for a smart gas of claim 1 is implemented.

7. An Internet of Things system for preset management of gas pipeline network for a smart gas, wherein the system comprises a smart gas user platform, a smart gas service platform, a smart gas management platform, a smart gas sensing network platform and a smart gas object platform, the smart gas management platform includes a smart user service management sub-platform, a smart operation management sub-platform and a smart gas data center, the smart gas management platform is configured to:
   obtain, by the smart gas data center, a region feature of each region within a target range through a smart gas sensing network platform;
   determine, by the smart operation management sub-platform, a gas demand degree of the each region based on the region feature of the each region; and
   clustering, by the smart operation management sub-platform, the each region within the target range based on location information and the gas demand degree to determine at least one clustering region;
   determining, by the smart operation management sub-platform, the region as a first-class region based on a total gas demand degree in a clustering region meeting a preset condition, and determining a gas pipeline network opening scheme of the first-class region using a preset procedure based on a region feature of the first-class region; wherein the total gas demand degree of the clustering region is determined by weighting the gas demand degree of each region of the clustering region; and a weighted weight is related to a completeness of supporting facilities of the each region;
   determining, by the smart operation management sub-platform, a clustering region as a second-class region within the target range of which the gas demand degree does not meet the preset condition, and determining a uniform opening time of gas pipeline network in the second-class region by processing the total gas demand degree of the second-class region through an opening time prediction model, wherein the opening time prediction model includes a second embedding layer and an opening time prediction layer, the second embedding layer processes the total gas demand degree to determine a total gas demand degree feature vector, and the opening time prediction layer processes the total gas demand degree feature vector to determine the uniform opening time of the gas pipeline network in the second-class region; and the opening time prediction model is a machine learning model.

* * * * *